United States Patent

Asano et al.

[11] Patent Number: 5,388,626
[45] Date of Patent: Feb. 14, 1995

[54] RADIAL TIRE

[75] Inventors: Kazuo Asano; Mitsushige Idei, both of Kobe; Tomoko Ookimoto, Itami, all of Japan

[73] Assignee: Sumitomo Rubber Industries, Ltd., Hyogo, Japan

[21] Appl. No.: 898,540

[22] Filed: Jun. 15, 1992

[30] Foreign Application Priority Data

Jun. 17, 1991 [JP] Japan .................................. 3-173188
Aug. 26, 1991 [JP] Japan .................................. 3-240396
Dec. 26, 1991 [JP] Japan .................................. 3-359473

[51] Int. Cl.⁶ .............................................. B60C 3/00
[52] U.S. Cl. .................................................. 152/454
[58] Field of Search ...................................... 152/454

[56] References Cited

U.S. PATENT DOCUMENTS

| | | |
|---|---|---|
| 4,462,447 | 7/1984 | Siefert et al. ................ 152/454 |
| 4,669,519 | 6/1987 | Togashi et al. ............... 152/454 |
| 4,867,218 | 9/1989 | Asano et al. . |
| 4,915,151 | 4/1990 | Sato et al. . |

FOREIGN PATENT DOCUMENTS

| | | | |
|---|---|---|---|
| 0128852 | 12/1984 | European Pat. Off. ........... 152/454 |
| 0297889 | 1/1989 | European Pat. Off. ........... 152/454 |
| 0314445 | 5/1989 | European Pat. Off. . |
| 0413574 | 2/1991 | European Pat. Off. . |
| 0060005 | 4/1985 | Japan ................................. 152/454 |
| 3067701 | 3/1991 | Japan ................................. 152/454 |
| 3197210 | 8/1991 | Japan ................................. 152/454 |
| 4087802 | 3/1992 | Japan ................................. 152/454 |

*Primary Examiner*—Caleb Weston
*Assistant Examiner*—Nancy Krawczyk

[57] ABSTRACT

A radial tire which mitigates reactions when running across protrusions to thereby avoid damage to the vehicle. The tire prevents rim touch, an indirect contact of the inner face of the tread portion with a flange of the rim or a direct contact of the tread portion with the bead portion. The tire has sidewall portions which are bulged-out to satisfy certain equations. An increase in sidewall thickness and carcass rigidity is avoided with the radial tire.

3 Claims, 9 Drawing Sheets bg
RADIAL TIRE

FIELD OF THE INVENTION

The present invention relates to a radial tire, in which reactions against running across protrusions are mitigated to prevent the car from being damaged.

DESCRIPTION OF THE BACKGROUND ART

Recently, to satisfy requirements for high speed straight running performance, high speed cornering performance, steering stability, rolling resistance and the like, belted radial tires having a low aspect ratio have been widely used for their high lateral stiffness, high cornering power and wide ground contacting width.

In such a low aspect ratio radial tire, however as the tire section height is relatively low, the radial distance of the inner face of the tread portion from the rim is short. Therefore, as shown in FIG. 10, when a large force F is applied to the tread, for example during running across a protrusion, the tire (t) is greatly deflected, and so called rim touch—an indirect contact of the inner face of the tread portion (a) with a flange of the rim (r) or a direct contact of the tread portion (a) with the bead portion (b)—is liable to occur. If rim touch occurs, the shock is directly applied to the car through the rim (r), and as a result, durability of the car, e.g. the suspension mechanism and the like is reduced.

To avoid this, the rigidity of the tire sidewall portion has been increased by increasing the rigidity of the carcass, providing a reinforcing layer, and/or increasing the rubber thickness of the sidewall portion especially on the axially inside of the carcass.

However, when the sidewall rigidity is increased in such a way, ride comfort is deteriorated. Further, once a tire whose rubber thickness is increased is deflected, the distance between the tread portion and bead portion becomes smaller than that being not increased, and rim touch occurs rather easily. Furthermore, the tire weight is increased to deteriorate the steering performance and running performance.

SUMMARY OF THE INVENTION

It is therefore, an object of the present invention to provide a radial tire, in which rim touch is prevented without increasing the sidewall thickness and the carcass rigidity.

In general, as shown in FIG. 11, the amount of tire deflection K increases in proportion to the applied load F, and the hatched area surrounded by the load/deflection curve, the X-axis of deflection K, and a perpendicular to the X-axis drawn at KO which is the maximum deflection at which rim touch occurs, corresponds to the amount of the energy stored in the deflected tire.

It was found that the larger the amount of the maximum stored energy, the larger the amount of absorbable shock.

Accordingly, for effectively preventing the occurrence of rim touch and to effectively mitigate the shock applied to the car when such a rim touch occurs, it is important that both the maximum deflection KO and the resistance to the load F are increased.

According to one aspect of the present invention, a radial tire comprises a tread portion, a pair of axially spaced bead portions, a pair of sidewall portions extending between the tread edges and the bead portions, and a radial carcass extending between the bead portions, the sidewall portions under a normally inflated state of the tire being bulged-out to satisfy the following conditions:

the total (HA+HC) of a height HA and a height HC is not less than 0.818 times the total (HA+HB+HC) of the height HA, the height HB and a height HC; and a distance HE is not more than 0.575 times a distance HD, wherein
the height HA is the radial distance between a point C and a point P1,
the height HB is the radial distance between the point P1 and a point P2,
the height HC is the radial distance between the point P2 and a point P3,
the distance HD is the radial distance between a point P4 and the point P3,
the distance HE is the axial distance between the point P4 and the point P3,
the point C is on the outer surface of the tread portion at the tire equator CO,
the point P1 is on the outer surface of the tread portion,
the point P2 is on the inner surface of the tread portion,
the point P3 is on the inner surface of the tire bead portion,
the point P4 is on the inner surface of the sidewall portion,
the points P1, P2 and P3 are at the same axial distance as a bead heel point PO, from the tire equator CO,
the point P4 is at the axially outermost point of the inner surface of the sidewall portion,
the bead heel point PO is the intersecting point between the bead base line and the bead side face line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described in detail in conjunction with the accompanying drawings which are given by way of illustration only, and thus are not limitative of the present invention, and in which.

DETAILED DESCRIPTION OF THE PREFERRED EMBODIMENTS

Figure 1:
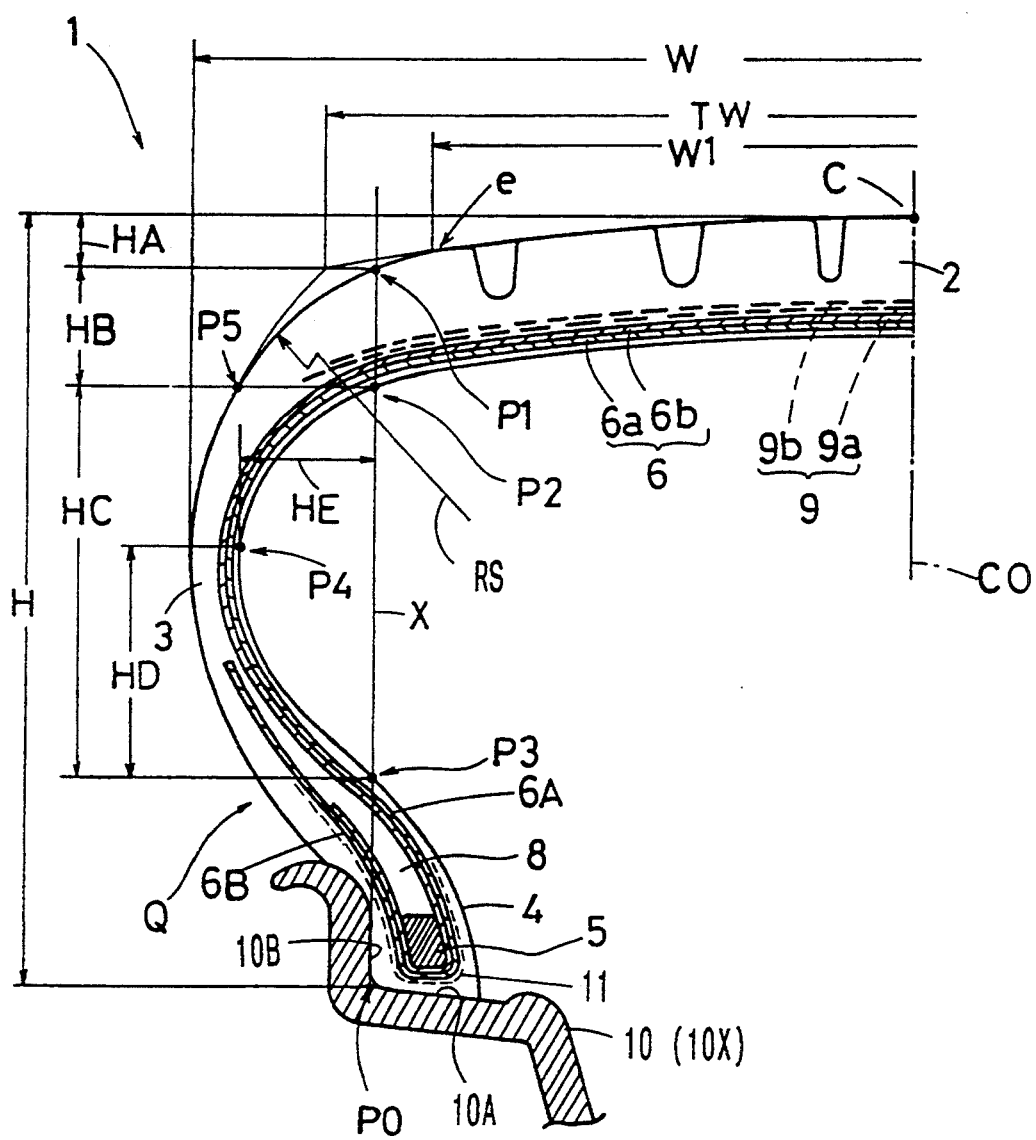
FIGS. 1(a) and 1(b) are cross sectional views of a tire according to the present invention.
Figure 1B:
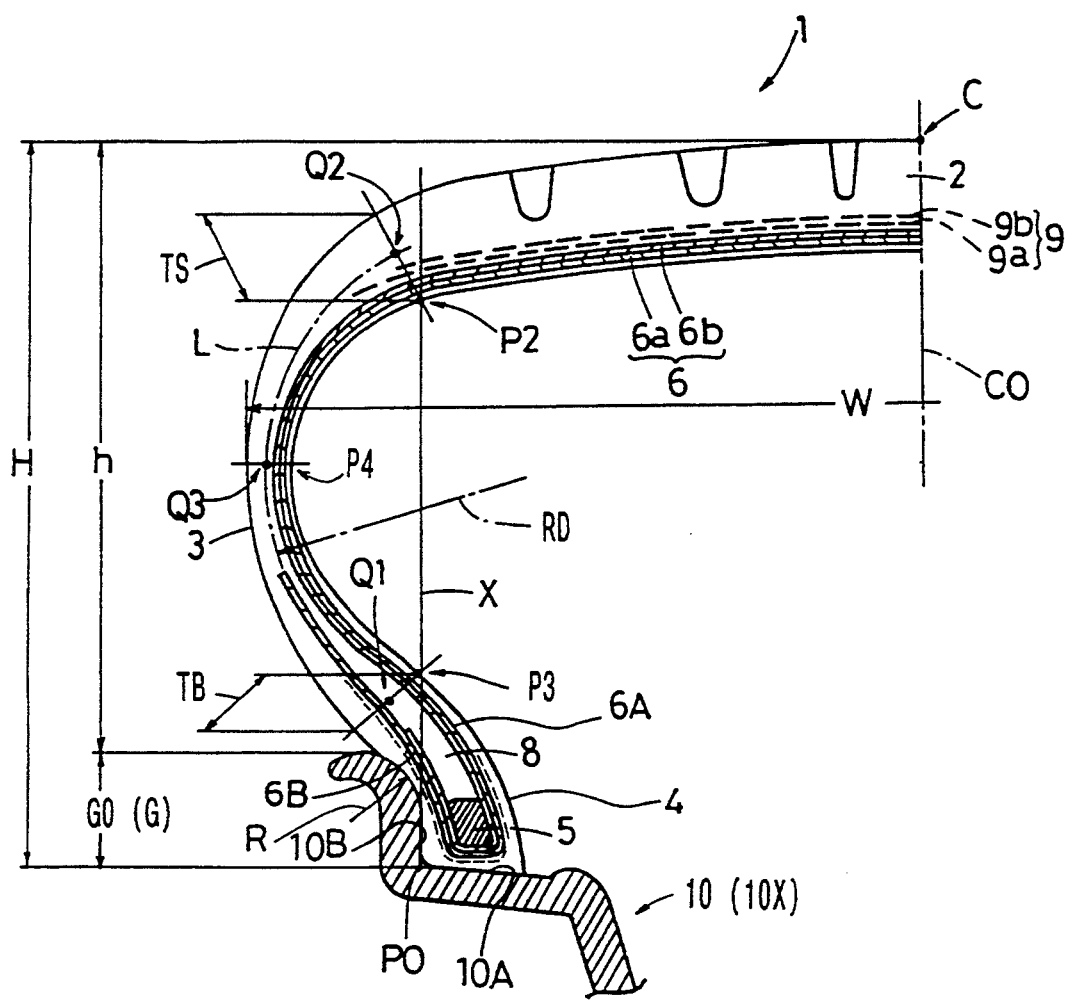

In FIGS. 1(a) and 1(b), the tire 1 is for passenger cars, and a normally inflated state thereof in which the tire is mounted on its regular rim 10 and inflated to its regular inner pressure but loaded with no tire load is shown.

The tire 1 has a tread portion 2, a pair of bead portions 4, and a pair of sidewall portions 3 extending between the tread edges and the bead portions 4.

The aspect ratio (section height H/section width W) of the tire is not more than 0.7. In this example, the aspect ratio is 0.6.

The tire 1 comprises a bead core 5 disposed in each of the bead portions 4, a carcass 6 extending between the bead portions 4 and turned up around the bead cores 5 from the axially inside to the outside thereof, and a belt 9 disposed radially outside the carcass crown in the tread portion 2.

The carcass 6 in this embodiment comprises two plies 6a and 6b of cords arranged radially at an angle of 75 to 90 degrees with respect to the tire equator CO.

The inner carcass ply 6a and the outer carcass ply 6b are turned up around the bead cores 5.

The axially outwardly located turned up portions of the inner carcass ply 6a are extended radially outwardly over the radially outer edges of the axially inwardly located turned up portions of the outer carcass ply 6b, and terminated near the tire maximum width point so as to completely cover the inward turned up edges.

For the carcass cords, organic fiber cords, e.g. nylon, polyester, rayon and the like are preferably used, but metallic cords, e.g. steel may be used.

Between the carcass plies 6a and 6b, the carcass cords are crossed.

The belt 9 comprises two plies 9a and 9b of cords laid at an angle of 0 to 30 degrees with respect to the tire equator CO in substantially parallel with each other.

For the belt cords, high modulus cords, e.g. steel cord, aromatic polyamide and the like are preferably used.

The radially inner belt ply 9a is wider than the radially outer belt ply 9b.

The maximum belt width or the width of the inner belt ply 9a in this embodiment is not less than 0.8 times the tread width TW.

Each of the bead portions 4 is provided between the carcass main portion 6A and each turned up portion 6B with a bead apex 8 of hard rubber extending taperingly radially outwards from the bead core 5.

Further, each of the bead portions 4 in this embodiment is provided with a bead reinforcing layer 11 made of steel cords laid at an angle of 20 to 70 degrees with respect to the adjacent carcass cords. The bead reinforcing layer 11 is turned up around the bead core 5 to extend along the axially inside of the carcass main portion 6A and the facings outside of the carcass turned up portion 6B.

The bead heel point PO is defined as the intersecting point between the base line of the bead portion 4 and the axially outer surface line of the bead portion 4.

The rim 10 is a center dropped rim, which has a pair of bead seats 10A for the bead portions 4 tapered at 5 degrees, a center well therebetween for tire mounting, and s flange 10B extending radially outwardly from the axially outer edge of each of the bead seats 10A. The axially inner surface of the flange 10B has a lower portion (10B1) extending perpendicular to the rotational axis of the rim and an upper portion (10B2) curved to extend radially and axially outwards from the upper end of the flat lower portion (10B1). When the tire 1 is mounted on its regular rim 10, the bead heel point PO is also defined as the intersecting point between the bead seat line and the perpendicular line of the lower flange portion (10B1).

According to one aspect of the invention, in the normally inflated state of the tire, the sidewall portions are bulged out as shown in FIG. 1(a) and satisfy the following conditions:

(HA +HC)/(HA +HB +HC) is not less than 0.818

HE/HD is not more than 0.575 where

HA is the radial distance between a point C and a point P1,

HB is the radial distance between the point P1 and a point P2,

HC is the radial distance between the point P2 and a point P3,

HD is the radial distance between the point P3 and a point P4,

HE is the axial distance between the point P3 and the point P4, the points C and P1 are on the outer surface of the tire tread portion 2, the points P2, P3 and P4 are on the inner surface of the tire at the tread portion 2, the bead portion 4 and the sidewall portion 3, respectively, the point C is at the tire equator CO, the points P1, P2, P5 are on a plane (X) being parallel with the tire equatorial plane CO and positioned at the bead heel point PO, the point P4 is the axially outermost point of the axially inner surface of the sidewall portion 3.

Figure 2:
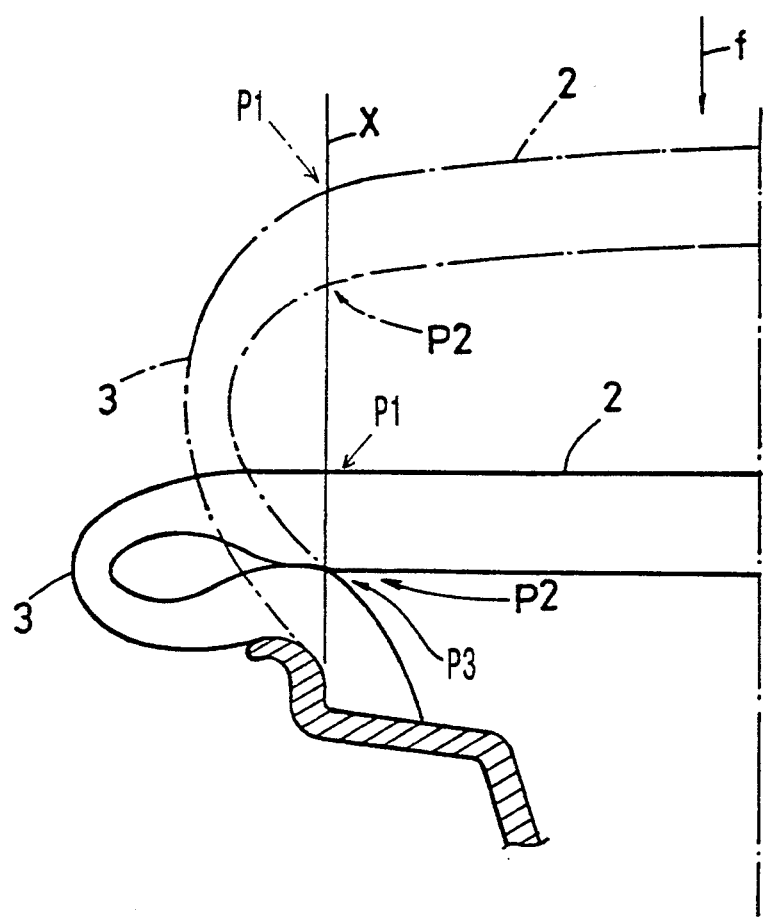
FIG. 2 is a cross sectional view of the tire showing a deflected state.

FIG. 2 schematically shows the state of the tire wherein the tire is deflected and the rim touch occurs. In this state, the sidewall portion 3 is bent and regions of the tire inner surface around the points P2 and P3 contact each other.

It was discovered that the total height (HA+HC) closely relates to a clearance for the maximum tire deflection, and the total height (HA+HB+HC) is generally determined by the tire size.

Figure 3:
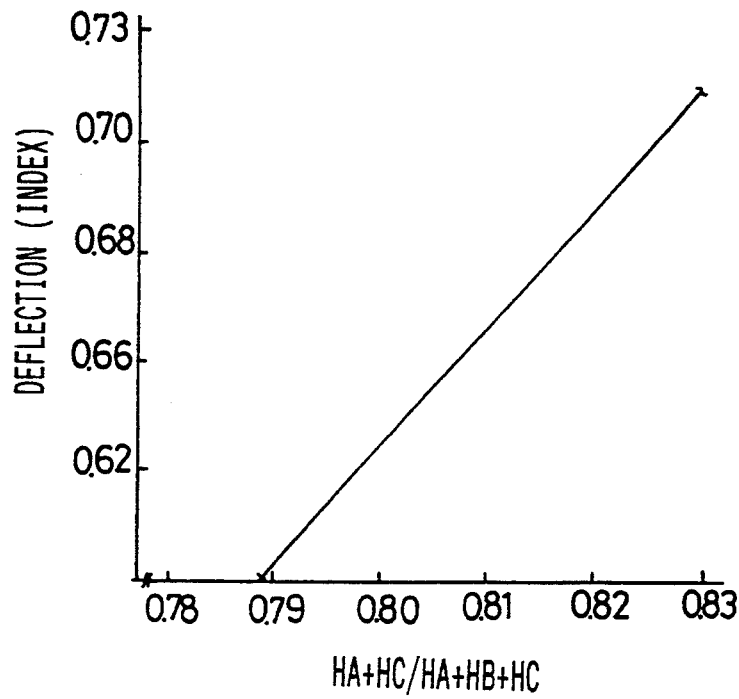
FIG. 3 is a graph showing a relationship between height ratio (HA+HC)/(HA+HB+HC) and tire deflection in index.

FIG. 3 shows the actual relationship in 185R60R14 tire size between the height ratio (HA+HC)/(HA+HB+HC) and the amount of maximum deflection in index. It was found that those parameters are in direct proportion.

Figure 4:
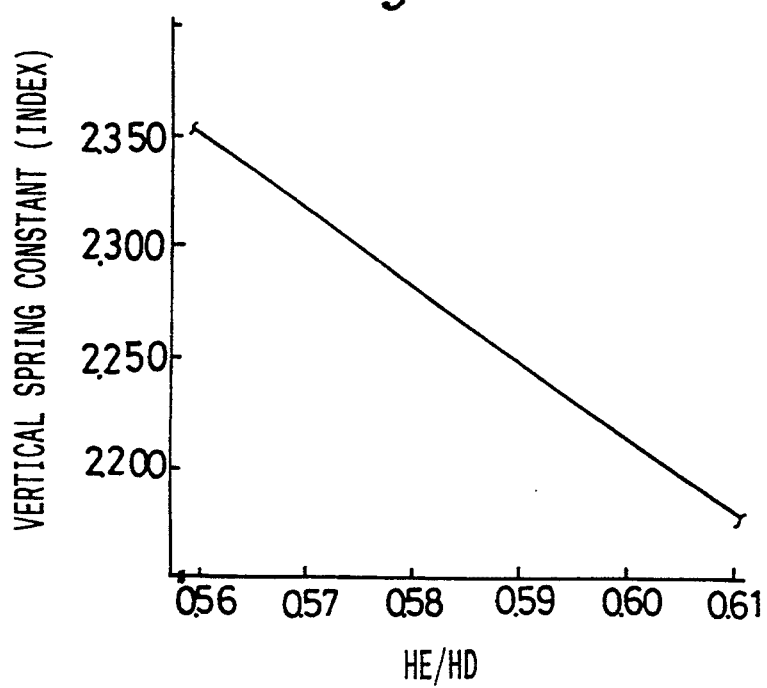
FIG. 4 is a graph showing a relationship between HE/HD ratio and tire vertical spring constant in index.

FIG. 4 also shows the actual relationship in 185/60R14 tire size between the HE/HD ratio and the tire vertical spring constant in index. It was also found that those parameters are in inverse proportion.

By increasing the height ratio (HA+HC)/(HA+HB+HC), the clearance to the rim touch is increased, and by decreasing the HE/HD ratio. the tire vertical spring constant is increased without decreasing the clearance. Thus, the absorbable energy is greatly improved.

By setting the HE/HD ratio not more than 0.575, the inclination of the sidewall lower portion to the equatorial plane is decreased, and the vertical spring constant of the tire is increased to improve the resistance to shock.

Preferably, the height ratio (HA+HC)/(HA+HB+HC) is not more than 0.83. If the height ratio (HA+HC)/(HA+HB+HC) exceeds 0.83, as the thickness of the tread portion 2 decreases, durability and wear life are liable to be decreased, and further running stability is liable to be disturbed.

Further, the HE/HD ratio is preferably, not less than 0.56.

If the HE/HD ratio is less than 0.56, the tire lateral stiffness is liable to excessively decrease to impair ride comfort.

Further, in this example, the tire shoulder profile is rounded such that a shoulder region SH defined as extending between the point P1 and a point P5 is formed by a single radius arc, of which radius RS is not less than 0.22 times the ground contacting width W1 measured between the axially outer edges (e) of the ground contacting region under a normal loaded state of the tire in which the tire is mounted on its regular rim 10 and inflated to its regular inner pressure and then loaded with its regular load, wherein the point P5 is that on the outer surface of the tire at the same radial height as the point P2. The single radius region is extended to the edge (e).

Figure 5:
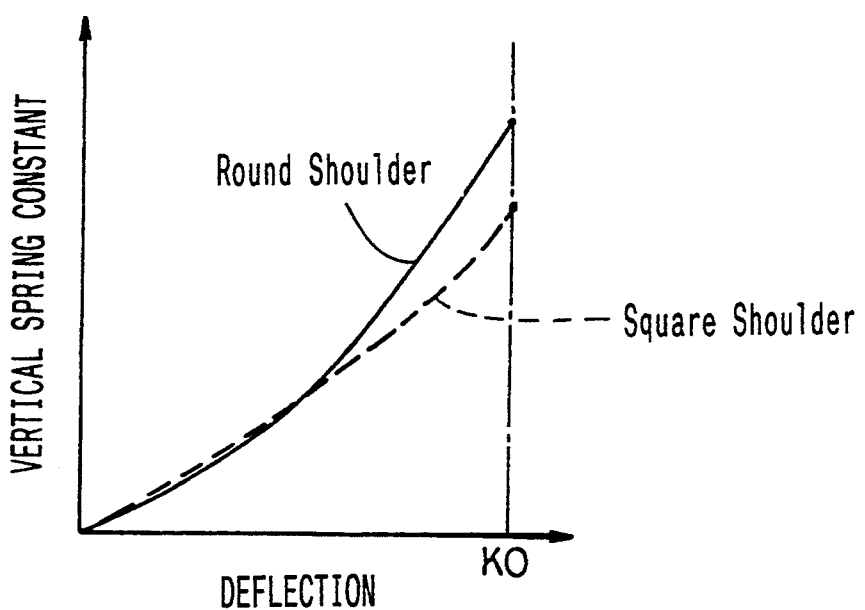
FIG. 5 is a diagram explaining the difference in load-deflection curve between a rounded shoulder tire and a squared shoulder tire.

In a tire having rounded shoulder regions, when the tire load increases over the regular load, the inclination of the load/deflection curve increases as shown in FIG. 5. As a result, the absorbable energy is increased.

Table 1 shows the results of tests, wherein the test tires had a size of 185/60R14 and constructions being substantially same as that shown in FIG. 1(a) with the exception of the (HA+HC)/(HA+HB+HC) ratio, HE/HD ratio and shoulder radius RS.

Each test tire was mounted on a 5.5J×14 rim, and inflated to 2.0 kgf/sq.cm.

The rolling resistance was measured at a constant speed of 80 km/h under a tire load of 350 kgf, using a drum. The results are indicated by an index based on that the reference tire 1 is 100.

In the rolling resistance test, the smaller the index, the better the result. In the other tests, the larger the index, the better the result.

TABLE 1

| Tire | Ref. 1 | Ref. 2 | Ref. 3 | Ref. 4 | Ex. 1 |
| --- | --- | --- | --- | --- | --- |
| (HA + HC)/(HA + HB + HC) | 0.810 | 0.809 | 0.789 | 0.812 | 0.820 |
| HE/HD | 0.606 | 0.593 | 0.570 | 0.567 | 0.575 |
| Shoulder radius RS | 0.186 | 0.212 | 0.176 | 0.203 | 0.273 |
| Test Results | | | | | |
| Absorbable energy | 100 | 104 | 100 | 116 | 124 |
| Deflection | 100 | 100 | 96 | 103 | 109 |
| Spring constant | 100 | 100 | 107 | 105 | 103 |
| Rolling resistance | 100 | 100 | 103 | 102 | 103 |

According to another aspect of the present invention, as shown in FIG. 1(b), the bead thickness TB measured normally to the tire inner surface from the point P1 to the tire outer surface is not more than 0.092 times the radial distance (h) between the point C and the radially outer end of the rim flange 10B; the total (TB+TS) of the bead thickness TB and the shoulder thickness TS measured normally to the tire inner surface from the point P2 to the tire outer surface is not more than 0.21 times the radial distance h; and the central point Q1 of the bead thickness TB, the central point Q2 of the shoulder thickness TS, and the central point Q5 of the sidewall thickness at the maximum width position P4 are positioned on a circle L, the radius RD of which is not less than 0.77 times the distance h.

That is, the TB/h ratio is not more than 0.092, the (TB+TS)/h ratio is not more than 0.21, and the RD/h ratio is not less than 0.77.

Figure 6:
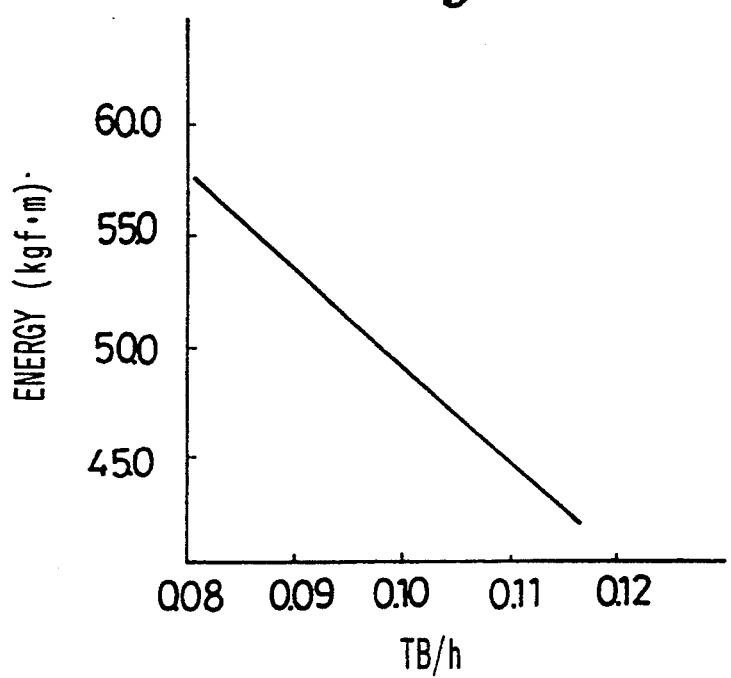
FIG. 6 is a graph showing a relationship between TB/h ratio and maximum absorbable energy.

FIG. 6 shows the relationship between the TB/h ratio and the maximum absorbable energy in 185/60R14 tire size.

Those parameters were found to be in inverse proportion.

Figure 7:
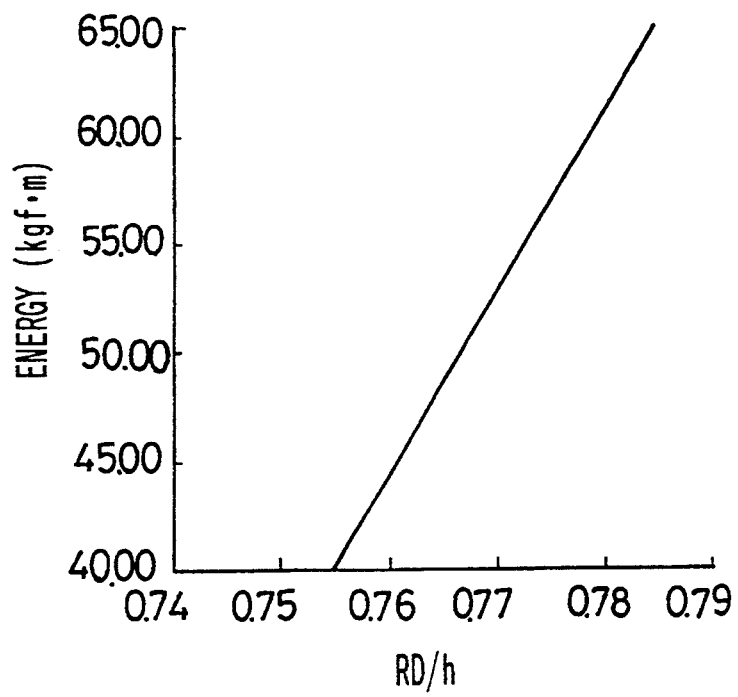
FIG. 7 is a graph showing a relationship between RD/h ratio and maximum absorbable energy.

FIG. 7 shows the relationship between the RD/h ratio and the maximum absorbable energy in 185/60R14 tire size, and it was found that the energy increases as the ratio increases.

Incidentally, the center line of the thickness of the sidewall portion between the points P1 and P2 is substantially coincide with the above-mentioned circle L.

By decreasing the TB/h ratio, the clearance to the rim touch is increased. By setting the RD/h ratio not less than 0.77, the inclination of the sidewall lower portion to the equatorial plane is decreased, and the vertical spring constant of the tire is increased. Thus, the absorbable energy is greatly increased.

Preferably, the TB/h ratio and the (TB+TS)/h ratio are respectively, not less than 0.080 and not less than 0.18.

When the TB/h ratio is less than 0.080, and when the (TB+TS)/h ratio is less than 0.18, it becomes difficult to maintain the tire rigidity and rim touch tends to occur.

Further, the RD/h ratio is preferably not more than 0.79.

If the RD/h ratio is more than 0.79, the tire lateral stiffness is liable to be decreased, and as a result, steering stability and ride comfort are deteriorated.

Table 2 shows the results of tests, wherein the test tires had a size of 185/60R14 and constructions being substantially same as that shown in FIG. 1(b) with the exception of the TB/h ratio, (TB+TS)/h ratio and RD/h ratio.

Each of the test tires was mounted on a 5.5J×14 rim, and inflated to 2.0 kgf/sq.cm.

The rolling resistance was measured at a constant speed of 80 km/h under a tire load of 350 kgf, using a drum. The steering stability and ride comfort were evaluated by a test driver.

The results are indicated by an index based on that the reference tire 5 is 100.

In the rolling resistance test, the smaller the index, the better the result. In the other tests, the larger the index, the better the result.

TABLE 2

| Tire | Ref. 5 | Ref. 6 | Ref. 7 | Ref. 8 | Ex. 2 |
| --- | --- | --- | --- | --- | --- |
| TB/h | 0.110 | 0.117 | 0.112 | 0.106 | 0.089 |
| (TB + TS)/h | 0.240 | 0.259 | 0.238 | 0.223 | 0.200 |
| RD/h | 0.76 | 0.76 | 0.75 | 0.76 | 0.77 |
| Test Results | | | | | |
| Absorbable energy | 100 | 104 | 100 | 116 | 124 |
| Rolling resistance | 100 | 100 | 103 | 102 | 103 |
| Steering stability | 100 | 101 | 102 | 101 | 100 |

TABLE 2-continued

| Tire | Ref. 5 | Ref. 6 | Ref. 7 | Ref. 8 | Ex. 2 |
| --- | --- | --- | --- | --- | --- |
| Ride comfort | 100 | 99 | 101 | 99 | 98 |

According to still another aspect of the invention, an assembly of the tire 1 and a rim 10X is provided, wherein to increase the maximum deflection of the tire, the rim flange is modified. Therefore, the rim 10X is not the regular rim 10. Incidentally, the regular rim is the rim officially approved for the tire by, for example JATMA (Japan), TRA (USA), ETRTO (Europe) and the like.

Figure 8:
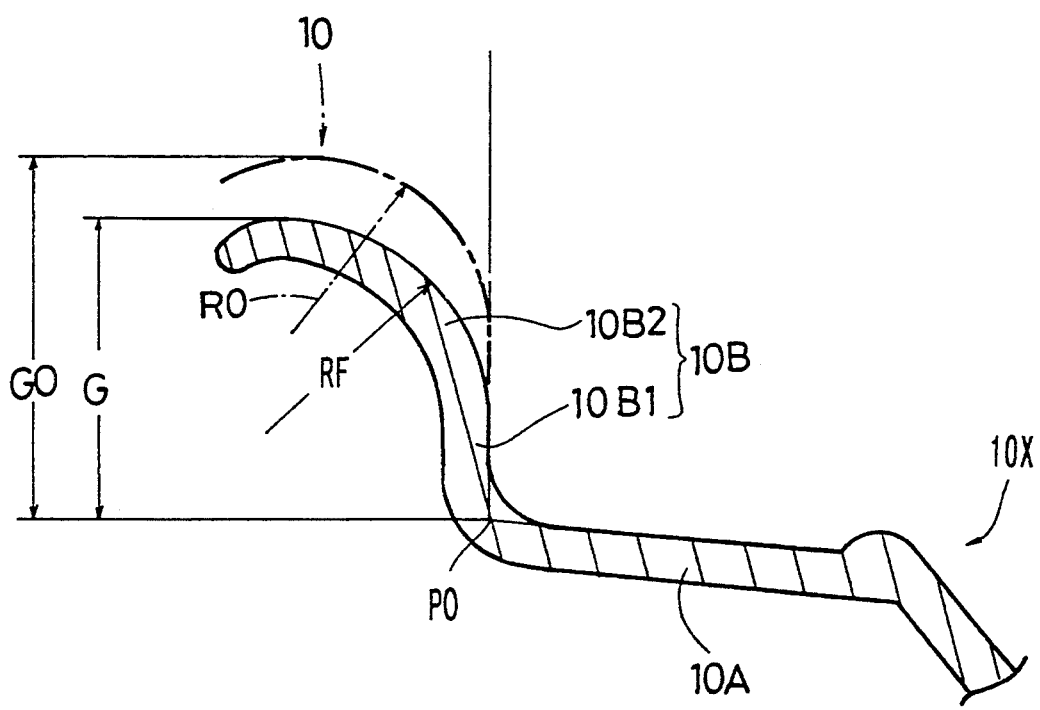
FIG. 8 is a cross sectional view of a modified rim flange.
Figure 10:
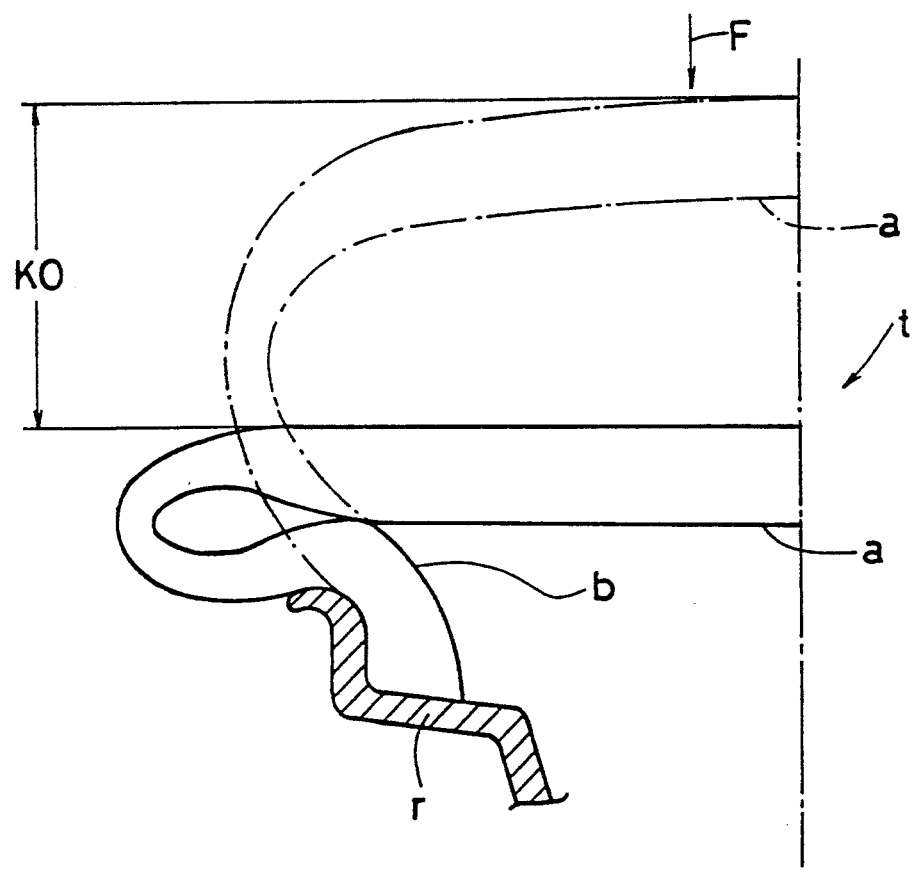
FIG. 10 is a cross sectional view explaining Rim touch.
Figure 11:
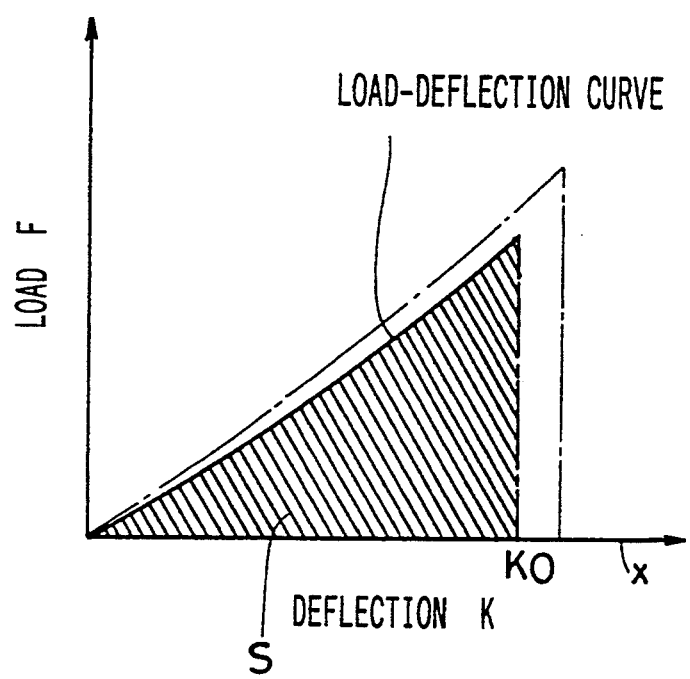
FIG. 11 is a graph showing a relationship between tire load F and tire deflection K.

The rim 10X has the same rim profile as the regular rim 10 with the exception of the upper part of the rim flange 10B, as shown in FIG. 8. The height G of the flange 10B of the rim 10X is decreased to 0.67 to 0.84 times the flange height GO of the regular rim 10, and the radius RF of the curved upper portion 10B2 of the flange is increased to 1.1 to 2.5 times the radius RO of that of the regular rim 10 (shown by chain line). Here, the flange height is measured radially from the bead heel point PO to the upper end of the flange 10B.

By decreasing the height of the rim flange and increasing the radius of curvature of the rim flange in comparison with the regular rim, the clearance to the rim touch is greatly increased to increase the absorbable energy.

For example, in a regular rim of 6JJ×14 size which is approved for the tire size 185/60R14, the radius RO is 9 mm, and the flange height GO is 18 mm. Accordingly, for a 185/60R14 tire, the radius R is 9.9 to 20.7 mm, and the flange height G is 12.1 to 15.1 mm. On the other hand, in the tire 1 which is mounted on the rim 10X, as the flange height G is decreased and as a result, the above-mentioned height (h) is increased, the parameters concerning this height (h) are changeable to meet the above-explained limitations.

Figure 9:
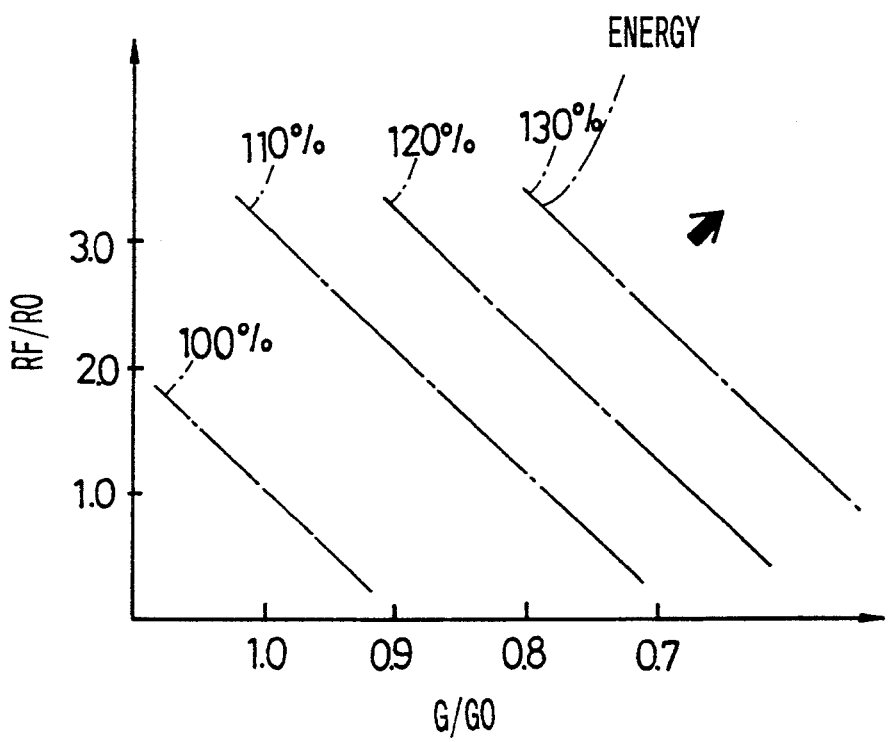
FIG. 9 is a graph showing a relationship between flange height, flange radius and maximum absorbable energy.

FIG. 9 shows the relationship between the flange height ratio G/GO, radius ratio RF/RO and the maximum absorbable energy in combinations of a 185/60R14 tire and rims whose corresponding rim size is 6JJ×14.

Table 3 shows the results of tests and the specifications of the test assemblies, wherein the test tires had a size of 185/60R14, and the test rims had the same construction and profile as a 6JJ×14 rim with the exception of the flange height and radius. The tire constructions were substantially the same as that shown in FIG. 1(b) with the exception of the TB/h ratio, (TB+TS)/h ratio and RD/h ratio. The tire pressure was 2.0 kgf/sq.cm.

The rolling resistance was measured at a constant speed of 80 km/h under a tire load of 350 kgf, using a drum. The steering stability and ride comfort were evaluated by a test driver.

The results are indicated by an index based on that the reference tire 1 is 100.

In the rolling resistance test, the smaller the index, the better the result. In the other tests, the larger the index, the better the result.

TABLE 3

| Tire/Rim Assembly | Ref. 1 | Ref. 2 | Ref. 3 | Ex. 1 |
| --- | --- | --- | --- | --- |
| Tire | | | | |
| TB/h | 0.110 | 0.110 | 0.089 | 0.089 |
| RD/h | 0.76 | 0.76 | 0.77 | 0.77 |
| (TB + TS)/h | 0.24 | 0.24 | 0.200 | 0.200 |
| Rim | | | | |
| Flange height G (mm) | 18 | 18 | 16 | 16 |
| Flange radius RF (mm) | 9 | 7 | 9 | 7 |
| Test Results | | | | |
| Absorbable energy | 100 | 106 | 118 | 124 |
| Rolling resistance | 100 | 102 | 101 | 103 |
| Steering stability | 100 | 100 | 100 | 100 |
| Ride comfort | 100 | 100 | 100 | 100 |

It was confirmed that by increasing the tire pressure up to 1.15 times the regular pressure, the absorbable energy is greatly increased up to 30% in comparison with a conventional tire.

As explained above, in the present invention, the maximum deflection of the tire and the resistance of the sidewall to load are increased, and the absorbable energy of the tire by its deflection is greatly increased to prevent rim touch and mitigate the shocks to the car body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An assembly of radial tire and a rim, the radial tire comprising a tread portion, a pair of axially spaced bead portions, a pair of sidewall portions extending between the tread edges and the bead portions, a bead core disposed in each of the bead portions, a radial carcass extending between the bead portions and turned up around the bead cores, and a belt disposed radially outside the carcass in tread portion, said rim comprising a pair of bead seats for the bead portions and a flange extending radially outwardly from the axially outer edge of each said bead seat and comprising a curved upper portion and a flat lower portion, the sidewall portions under a normally inflated state of the tire are bulged-out so as to satisfy the following conditions:

the total (HA+HC) of a height HA and a height HC is not less than 0.818 times the total (HA+HB+HC) of the height HA, the height HB and the height HC; and a distance HE is not more than 0.575 times a distance HD, wherein the height HA is the radial distance between a point C and a point P1, the height HB is the radial distance between the point P1 and a point P2, the height HC is the radial distance between the point P2 and a point P3, the distance HD is the radial distance between the point P3 and a point P4, the distance HE is the axial distance between the point P3 and the point P4, the points C and P1 are on the outer surface of the tire tread portion, the points P2, P3 and P4 are on the inner surface of the tire at the tread portion, the bead portion and the sidewall portion respectively, the point C is the tire equator CO, the points P1, P2, P3 are on a plane (X) being parallel with the tire equatorial plane CO and positioned at the bead heel point PO, the point P4 is the axially outermost point of the axially inner surface of the sidewall portion, the bead heel point PO is the intersecting point between the bead base line and the bead side face line, a bead thickness TB measured normally to the tire inner surface from said point P3 to the tire outer surface is not more than 0.092 times the radial distance (h) between said point C and the radially outer end of the flange, and the central point Q1 of the bead thickness TB measured normally to the tire inner surface from said point P3 to the tire outer surface, the central point Q2 of the shoulder thickness TS measured normally to the tire inner surface from said point P2 to the tire outer surface, and the central point Q3 of the sidewall thickness at said point P4 are positioned on a circle (L) of which radius RD is not less than 0.77 times said distance (h).

2. The assembly of the radial tire and the rim according to claim 1, wherein the shoulder portions of the tire are rounded such that a shoulder region extending axially outwardly from said point P1 to a point P5 is formed by a single radius arc, said point P5 is on the outer surface of the tire at the same radial height as said point P2, the radius RS of said single radius arc is not less than 0.22 times the ground contacting width (W1) measured between the axially outer edges (e) of the ground contacting region under a normal loaded state of the tire in which the tire is mounted on the rim and inflated to its regular inner pressure and then loaded with its regular load.

3. The assembly of the radial tire and the rim as claimed in any one of claims 1 to 2, wherein said tire is inflated to 1.15 times its regular pressure specified for the tire.

* * * * *